United States Patent
Kumar Kn et al.

(10) Patent No.: US 9,306,622 B2
(45) Date of Patent: Apr. 5, 2016

(54) NON-CONTACT SENSING AND READING OF SIGNALS TRANSMITTED BY A CABLE

(71) Applicant: HONEYWELL INTERNATIONAL INC., Morristown, NJ (US)

(72) Inventors: Dinesh Kumar Kn, Karnataka (IN); Sandhya Kavalloor, Karnataka (IN); Balakrishna G. Gudi, Karnataka (IN); Chandrashekar Thayumanavan, Karnataka (IN); Sai Krishnan Jagannathan, Karnataka (IN)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 14/482,867

(22) Filed: Sep. 10, 2014

(65) Prior Publication Data

US 2016/0072549 A1 Mar. 10, 2016

(51) Int. Cl.
*H04B 17/00* (2015.01)
*H04B 3/46* (2015.01)
*H04L 25/02* (2006.01)
*H04L 27/00* (2006.01)

(52) U.S. Cl.
CPC .............. *H04B 3/46* (2013.01); *H04L 25/0292* (2013.01); *H04L 27/0002* (2013.01)

(58) Field of Classification Search
CPC ... H04B 17/0065; H04B 17/0042; H04L 1/24
USPC .................... 375/228, 224; 340/435
See application file for complete search history.

(56) References Cited

U.S. PATENT DOCUMENTS

| | | | |
|---|---|---|---|
| 5,414,344 A | 5/1995 | Chinn | |
| 6,281,786 B1* | 8/2001 | Adachi et al. | 340/435 |
| 6,472,882 B1 | 10/2002 | Tiemann et al. | |
| 6,963,197 B1 | 11/2005 | Feight et al. | |
| 2007/0086135 A1 | 4/2007 | Swartzendruber et al. | |
| 2010/0060592 A1* | 3/2010 | Bernstein et al. | 345/173 |
| 2011/0210844 A1 | 9/2011 | Dey | |
| 2013/0218502 A1* | 8/2013 | Artiuch et al. | 702/98 |

* cited by examiner

*Primary Examiner* — Khai Tran
(74) *Attorney, Agent, or Firm* — Jetter & Associates, P.A.

(57) ABSTRACT

A method for sensing modulated signals in a process facility. The method includes providing a monitoring device that includes a non-contact electromagnetic sensor (EM sensor) configured to sense a modulated signal transmitted on a cable including a conductor coupled to a sensing device or apparatus in the process facility. The monitoring device further includes a non-transitory machine readable storage device and a processor. The non-transitory machine readable storage device stores a data decoding program including protocol information for identifying different communication protocols. The monitoring device is positioned in proximity to the cable for the EM sensor to detect the modulated signal. The data decoding program is implemented by the processor causing the processor to detect the modulated signal and condition the modulated signal to provide a conditioned modulated signal. The conditioned modulated signal is decoded to generate decoded signal data, and the decoded signal data is displayed.

18 Claims, 5 Drawing Sheets

NON-CONTACT SENSING AND READING OF SIGNALS TRANSMITTED BY A CABLE

FIELD

Disclosed embodiments relate to sensing and reading (decoding) modulated signals transmitted by a cable in a process facility

BACKGROUND

Process facilities typically include tanks for the storage of liquid or granular materials. For example, at a petroleum or chemical refinery, tanks are used to store liquid feedstock such as crude oil and liquid products such as gasoline, diesel fuel and liquefied gasses. The tanks are typically large structures that can be 30 to 60 feet high. A liquid level gauge is typically mounted to the top surface of the tank (or nozzle) to measure the level of liquid material in the tank. The liquid level gauge generally has a display screen which can be read by an operator after climbing to the top of the tank. If the volume of the tank is known, the volume of material in the tank can be calculated from the measured level.

SUMMARY

This Summary is provided to introduce a brief selection of disclosed concepts in a simplified form that are further described below in the Detailed Description including the drawings provided. This Summary is not intended to limit the claimed subject matter's scope.

Disclosed embodiments provide monitoring devices including a non-contact electromagnetic field sensor (EM sensor) configured for non-contact sensing the EM field associated with a modulated parameter signal transmitted on at least one cable including a conductor between a process facility and a sensing device (e.g., a field device) or apparatus (e.g., a tank gauge) which meet the unmet need exists for a probe-like device that can sense such modulated signals. As used herein a "modulated signal" is the result of a modulation process that encodes information by varying one or more properties of a periodic waveform generally called the carrier signal, where the modulation contains the information to be transmitted, including parametric information. As used herein an "EM sensor" can be an electric field and/or a magnetic field sensor.

Disclosed embodiments include a method for sensing modulated signals in a process facility. The method includes providing a monitoring device that includes a non-contact EM sensor configured for sensing a modulated signal transmitted on a cable including a conductor between a process facility and a sensing device or apparatus. The monitoring device further includes a non-transitory machine readable storage device and at least one processor. The non-transitory machine readable storage device stores a data decoding program including protocol information for identifying a plurality of different communication protocols. The monitoring device is positioned (e.g., by the user) in proximity to the cable sufficiently close for the EM sensor to detect the modulated signal. The data decoding program is implemented by the processor causing the processor to execute: responsive to detecting the modulated signal, conditioning the modulated signal to provide a conditioned modulated signal. The conditioned modulated signal is decoded to generate decoded signal data and the decoded signal data is displayed by the monitoring device.

Disclosed monitoring devices include a non-contact EM sensor that is configured to sense a modulated signals transmitted on a cable including a conductor between a process facility and sensing device or apparatus. A signal conditioner is in communication with the EM sensor. A processor is in communication with the signal conditioner. The processor is connected to a storage device that has a non-transitory machine readable storage medium. The storage device stores a data decoding program including protocol information for identifying a plurality of different communication protocols. The processor is programmed to implement the data decoding program. A display is coupled to an output of the processor. The data decoding program causes the processor to responsive to detecting the modulated signal, the processor triggers the signal conditioner to condition the modulated signal to provide a conditioned modulated signal. The processor decodes the conditioned modulated signal to generate decoded signal data. The processor displays the decoded signal data on the display.

DETAILED DESCRIPTION

Figure 1:
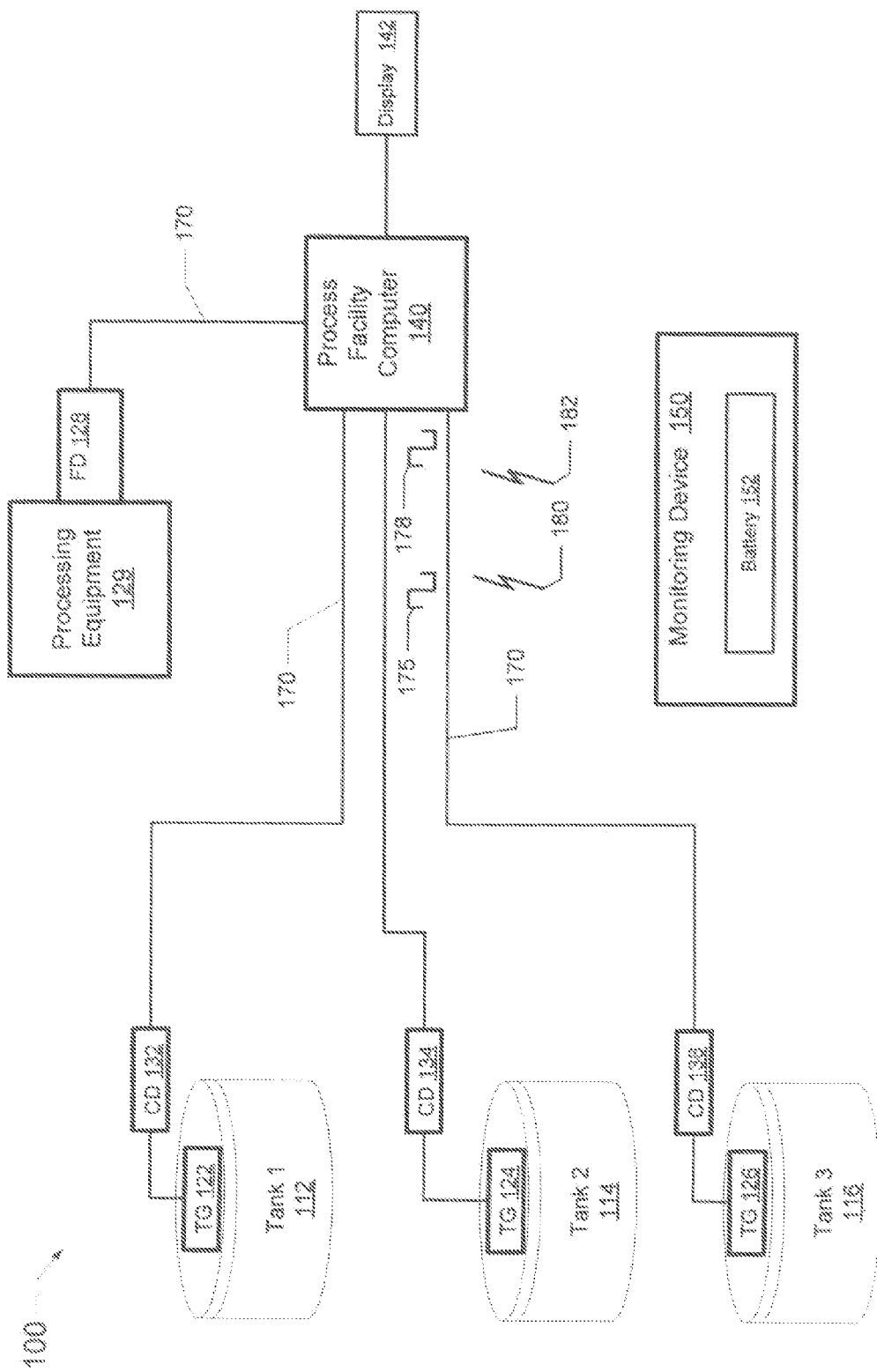
FIG. 1 is a block diagram of an example process facility including a monitoring device, according to an example embodiment.

Disclosed embodiments are described with reference to the attached figures, wherein like reference numerals are used throughout the figures to designate similar or equivalent elements. The figures are not drawn to scale and they are provided merely to illustrate certain disclosed aspects. Several disclosed aspects are described below with reference to example applications for illustration. It should be understood that numerous specific details, relationships, and methods are set forth to provide a full understanding of the disclosed embodiments.

One having ordinary skill in the relevant art, however, will readily recognize that the subject matter disclosed herein can be practiced without one or more of the specific details or with other methods. In other instances, well-known structures or operations are not shown in detail to avoid obscuring certain aspects. This Disclosure is not limited by the illustrated ordering of acts or events, as some acts may occur in different orders and/or concurrently with other acts or events. Furthermore, not all illustrated acts or events are required to implement a methodology in accordance with the embodiments disclosed herein.

Disclosed embodiments provide a method, a monitoring device and a computer program product for non-contact sensing modulated signals in a process facility. The method includes providing a monitoring device that includes an EM sensor configured to sense a modulated signal transmitted on a cable including a conductor coupled to a sensing device or apparatus in the process facility. The monitoring device further includes a non-transitory machine readable storage device and at least one processor. The non-transitory machine readable storage device stores a data decoding program including protocol information for identifying a plurality of different communication protocols. The stored protocol information for identifying a plurality of different communication protocols loaded in the memory of the monitoring device is based on the communication protocol(s) currently used in the processing facility, and can also include other communication protocols that are either commercially available or planned for future use.

The monitoring device is positioned by the user in proximity to the cable sufficiently close for the EM sensor to detect the modulated signal. The data decoding program is implemented by the processor causing the processor to execute: responsive to detecting the modulated signal, conditioning the modulated signal to provide a conditioned modulated signal. The conditioned modulated signal is decoded to generate decoded signal data and the decoded signal data is displayed.

FIG. 1 illustrates a block diagram of an example process facility 100. Process facility 100 can be a variety of manufacturing plants or storage locations that handle, process, store and transport a liquid or fluid material. Process facility 100 can include manufacturing plants, chemical plants, crude oil refineries, ore processing plants, paper manufacturing plants, water processing plants and tank farms. These industries and facilities typically use continuous processes and fluid processing.

Process facility 100 comprises several liquid storage tanks including tank 1 112, tank 2 114 and tank 3 116 (collectively tanks 112-116). Tanks 112-116 are each able to receive, discharge and store a liquid or fluid. Each tank has a tank sensor or tank gauge, referred to herein as being a "TG". Tank 1 112 has a TG 122. Tank 2 114 has a TG 124. Tank 3 116 has a TG 126 (collectively TGs 122-126). The TGs 122-126 function to measure or sense the liquid level contained within each of tanks 112-116 and to generate an electrical signal indicative of the level of liquid in each tank. In one embodiment, the TGs 122-126 can use radar to measure the liquid level contained in a respective tank. In another embodiment, TGs 122-126 can also function to regulate the intake and discharge of liquids in tanks 112-116. For example, TGs 122-126 can control valves mounted to respective tanks 112-116 in order to regulate fluid flow.

Each of TGs 122-126 is in communication with a process facility computer 140 via a communication device (CD) that can comprise a transceiver TG 122 is in communication with process facility computer 140 via CD 132. TG 124 is in communication with process facility computer 140 via CD 134. TG 126 is in communication with process facility computer 140 via CD 136. Each of CDs 132-136 can send and receive data, instructions and information between process facility computer 140 and TGs 122-126 over electrical cables 170. Electrical cable 170 is formed from several individual wires or conductors. There are also sensors or gauges besides TGs 122-126 in process facility 100 shown as field device (FD) 128 associated with processing equipment (e.g., furnace) 129 coupled to an electrical cable 170, where FD 128 senses parameters associated with equipment 129, such as FD 128 sensing temperature, pressure, vacuum, or position.

A video display 142 is connected to process facility computer 140. Video display 142 can show data received from TGs 122-126 to an operator or user.

Wires or conductors wires of cables 170 carry modulated signals 175 between CDs 132-136 and process facility computer 140. Modulated signals 175 can be from a wide variety of electrical signals that use a variety of signal speeds, voltages, frequencies, modulation techniques and data transmission protocols. In one particular embodiment, modulated signals 175 can use a bi-phase mark modulated (BPM) protocol.

A monitoring device 150 can be used to sense, detect and decode modulated signals 175. In one embodiment the modulated signals 175 can be encrypted. For example, the operation of a cipher as known in encryption depends auxiliary information, commonly referred to as a "key". The encrypting procedure is varied depending on the key, which changes the detailed operation of the encrypting algorithm. A key is generally selected before using a cipher to encrypt a message. Without knowledge of the key, it is generally impossible to decrypt the resulting ciphertext into readable plaintext. In this this embodiment, the monitoring device 150 is provided the key.

Monitoring device 150 is a lightweight, portable, handheld, self-powered unit that can be readily transported by a user for use as an EMF probe throughout the process facility 100. Battery 152 can supply power to monitoring device 150. In one embodiment, monitoring device 150 can be powered via a utility power source (mains powered). Monitoring device 150 can detect an electromagnetic field 180 around electrical cable 170 without contacting the conductor of the electrical cable 170. Electromagnetic field 180 is generated when modulated signals 175 are transmitted on electrical cables 170. In one embodiment, monitoring device 150 is placed adjacent to electrical cable 170 in order to detect electromagnetic field 180. In another embodiment, monitoring device 150 can be clamped on or surround the dielectric coating of electrical cable 170 in order to detect electromagnetic field 180.

Monitoring device 150 is configured or selected to not perturb the EM field emanating from the cable and to prevent coupling and reflection to obtain precise results. Monitoring device 150 is generally based on one of the two main types of EMF detectors being (i) a broadband probe that performs broadband measurements which senses EM signals across a wide range of frequencies (e.g., 100 kHz-2,500 MHz) and typically includes three independent diode detectors or (ii) a probe that provides frequency selective measurements that includes a field antenna and a frequency selective receiver or spectrum analyzer to enable monitoring the frequency range of interest. Monitoring device 150 may respond to EM fields only on one axis, or may be tri-axial, showing components of the EM field in three directions at once.

Monitoring device 150 can also generate an RF signal 182. RF signal is generated by monitoring device 150 in order to induce a test signal 178 in electrical cables 170. In one embodiment, monitoring device 150 is placed adjacent to electrical cable 170 in order to couple an RF signal 182 to electrical cables 170 and induce an electrical test signal 178 in one or more conductors of the electrical cables 170. Test signal 178 can contain a test pattern that tests various operations or functions of TGs 122-126.

Figure 2:
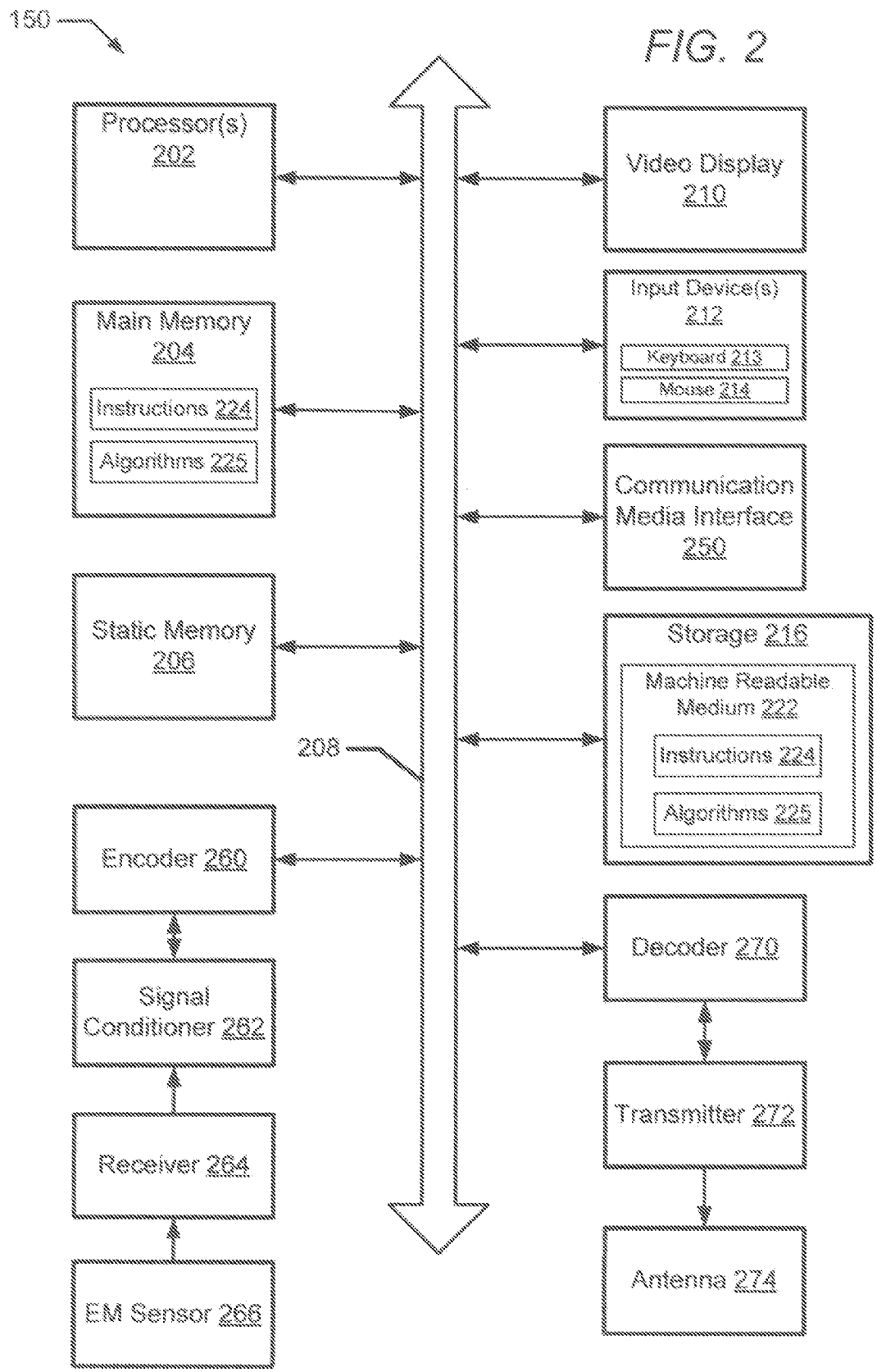
FIG. 2 is a block diagram of the monitoring device, according to an example embodiment.

FIG. 2 illustrates an example block diagram of monitoring device 150 within which a set of instructions 224 and/or algorithms 225 can be executed causing the monitoring device 150 to perform any one or more of the methods, processes, operations, applications, or methodologies described herein.

Monitoring device 150 includes one or more processors 202 such as a central processing unit (CPU), a main memory 204 and a static memory 206, which communicate with each other via a system bus 208 which can represent a data bus and an address bus. Main memory 204 can store instructions 224 and/or algorithms 225 for execution by processor 202. The monitoring device 150 further includes a video display 210 which is connected to system bus 208. The monitoring device 150 also has input devices 212 such as an alphanumeric input device (e.g., keyboard 213) and a cursor control device (e.g., a mouse 214) that are connected to system bus 208.

A storage device 216, such as a hard drive or solid state drive, is connected to and in communication with the system bus 208. The storage device 216 includes a machine readable medium 222 on which is stored one or more sets of software such as instructions 224 and/or algorithms 225 embodying any one or more of the methodologies or functions described herein. The instructions 224 and/or algorithms 225 can also reside, completely or at least partially, within the main memory 204 and/or within the processor 202 during execution thereof by the process facility computer 140. The main memory 204 and the processor 202 also contain machine readable media.

While the machine readable medium 222 is shown in an example embodiment to be a single medium, the term "machine readable medium" should be taken to include a single medium or multiple media (e.g., a centralized or distributed database, and/or associated caches and servers) that store the one or more sets of instructions. The term "machine readable medium" shall also be taken to include any medium that is capable of storing, encoding or carrying a set of instructions for execution by the computer system and that cause the computer system to perform any one or more of the methodologies shown in the various embodiments of the present invention. The term "machine readable medium" shall accordingly be taken to include, but not be limited to, solid-state memories, optical and magnetic media, and carrier wave signals.

The monitoring device 150 further includes an EM sensor 266 that can sense or detect the electromagnetic field 180 resulting from modulated signals 175. In one embodiment, EM sensor 266 can be an electric field sensor or a magnetic field sensor. EM sensor 266 is connected to a receiver 264 that receives an induced signal from EM sensor 266. Signal conditioner 262 contains amplifiers and filters that condition analog signals received from receiver 264. Signal conditioner 262 can amplify and reject noise from the modulated signals received from receiver 264 and generate a conditioned modulated signal. Signal conditioner 262 is connected to an encoder 260. Encoder 260 is connected to system bus 208. Encoder 260 converts the conditioned modulated signals from signal conditioner 262 into digital signals and transmits the digital signals to system bus 208. Monitoring device 150 further includes a communication media interface 250 that is connected to system bus 208. In one embodiment, communication media interface 250 is a USB connector or an Ethernet connector that allows for the detected signals to be transmitted to another device.

Figure 3:
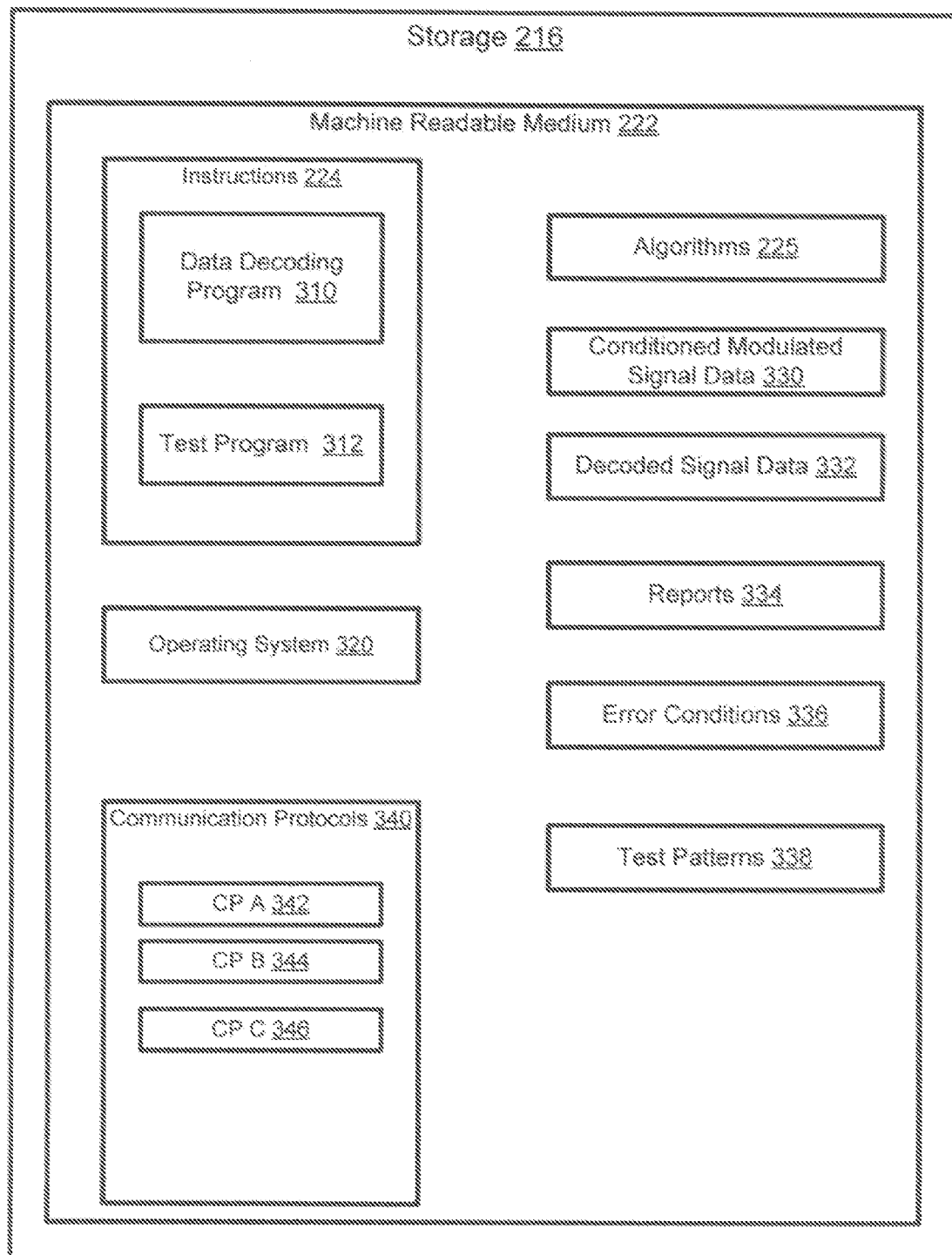
FIG. 3 is an example illustration of contents of a computer readable storage medium, according to an example embodiment.

Monitoring device 150 also has decoder 270 that is connected to system bus 208. Decoder 270 converts digital signals received from system bus 208 into analog signals. Decoder 270 is connected to transmitter 272. Transmitter 272 is connected to antenna 274. Transmitter 272 receives analog signals from decoder 270, generates an RF signal 182 from the analog signal and transmits the RF signal 182 on antenna 274. When antenna 274 is adjacent to electrical cable 170, RF signal 182 can induce a test signal 178 within conductors of electrical cable 170. With reference to FIG. 3, example contents of machine readable medium 222 stored within storage device 216 are shown. Machine readable medium 222 can store instructions 224 and/or algorithms 225 for execution by processor 202. Instructions 224 can include a data decoding algorithm or data decoding program 310 and a test algorithm or test program 312. Data decoding program 310, when executed by processor 202 can use protocol information to decode the conditioned modulated signal and generate decoded signal data 332. Test program 312, when executed by processor 202 causes monitoring device 150 to transmit an RF signal 182 that induces a test signal 178 in electrical cable 170.

An operating system (O/S) 320 is also stored in machine readable medium 222. O/S 320 manages resources and provides common services for process facility 140. Machine readable medium 222 further can store conditioned modulated signal data 330 received from encoder 260 and decoded signal data 332. Decoded signal data 332 is generated from conditioned modulated signal data 330. Machine readable medium 222 also can store reports 334, error conditions 336 and test patterns 338. Reports 334 can summarize selected decoded signal data 332. Error conditions 336 can contain error conditions detected in modulated signals 175. For example, if the signal strength or noise level of modulated signals 175 is outside of pre-determined limits, an error condition 336 can be generated. Modulated signals 175 can also include data regarding alarm events or error reported by other devices connected to electrical cable 170. Test patterns 338 are used by test program 312 to generate RF signal 182 that induces a test signal 178 in electrical cable 170

Machine readable medium 222 further can store communication protocols (CP) 340. CP 340 are a set rules for data exchange between TGs 122-126 and process facility 140. CP 340 define the syntax, semantics, and synchronization of communications. CP 340 includes several formats or protocols for exchanging data. CP 340 includes protocol information for identifying several different communication protocols including CP A 342, CP B 344 and CP C 346 (collectively CPs 342-346).

Figure 4:
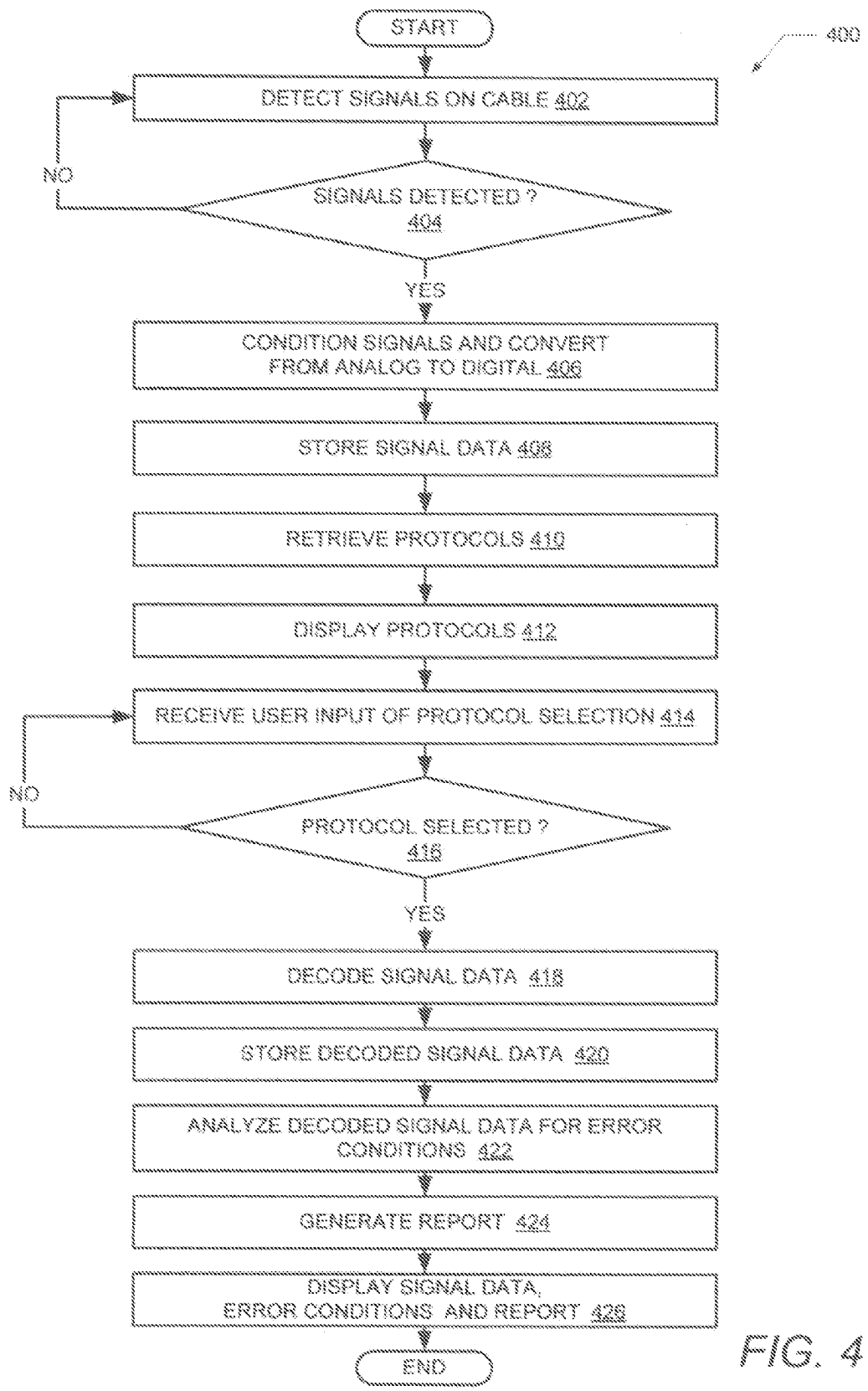
FIG. 4 is a flow chart that shows steps in an example method of sensing and decoding modulated signals in a process facility, according to an example embodiment.

FIG. 4 provides a flow chart showing steps in an example method 400 for sensing modulated signals in process facility 100. Method 400 can be implemented via the execution of instructions 224 and/or algorithms 225 by processor 202 within monitoring device 150 and specifically by the execution of data decoding program 310 by processor 202. Method 400 begins at the start block and proceeds to block 402 where EM sensor 266 senses or detects analog modulated signals (modulated signals) 175 (which can have analog or digital modulation) on electrical cable 170 and receiver 264 receives the modulated signals. During use, monitoring device 150 is positioned by a user in proximity to electrical cable 170 sufficiently close for the EM sensor 266 to detect the modulated signals 175.

EM sensor 266 senses the electromagnetic field 180 resulting from the modulated signals 175. Processor 202 determines if any modulated signals 175 have been detected (block 404). In response to no modulated signals 175 being detected, method 400 returns to block 402 to continue sensing for modulated signals 175 on electrical cable 170. In response to modulated signals 175 being detected, processor 202 triggers signal conditioner 262 to condition (filter noise and optionally amplify) the modulated signals received from receiver 264 to generate analog conditioned signals and encoder 260 converts the analog conditioned signals into digital conditioned signals and transmits the digital conditioned signals to system bus 208 (block 406). Processor 202 stores the digital conditioned signals to conditioned signal data 330 (block 408).

Processor 202 retrieves CP 340 including CPs 342-346 (block 410) from storage 216 and displays CPs 342-346 to a user on video display 210 (block 412). At block 414, processor 202 receives a selection by the user of one of CPs 342-346.

In one embodiment, a user can select one of CPs 342-346 using an input device 212 such as a mouse 214. In another embodiment, processor 202 can automatically determine the CPs 342-346 that are required. Processor 202 determines if the user has selected one of CPs 342-346 at decision block 416. In response to no selection being made, method 400 returns to block 416 to continue waiting for a user selection. In response to one of CPs 342-346 being selected by the user, processor 202 decodes the conditioned modulated signal data 330 using the selected protocol and generates decoded signal data 332 (block 418). Processor 202 stores the decoded signal data 332 to storage 216 (block 420).

Processor 202 analyzes the decoded signal data 332 to determine if any error conditions 336 have occurred (block 422) and generates a report 334 containing the decoded signal data 332 and the error conditions 336 (block 424). Processor 202 displays the decoded signal data 332, the error conditions 336 and the report 334 on video display 210 (block 426). Method 400 then ends.

Figure 5:
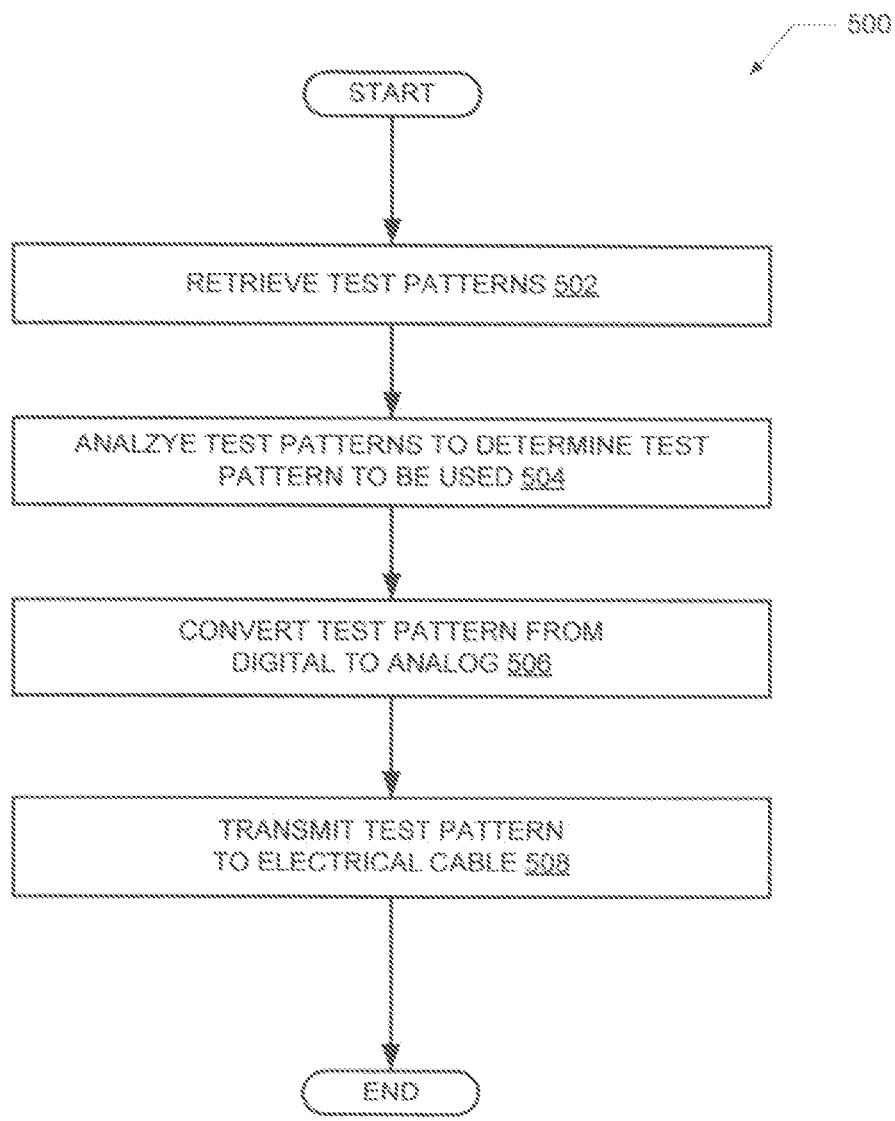
FIG. 5 is a flow chart that shows steps in a method of determining a test pattern to be used and transmitting the test pattern, according to an example embodiment.

FIG. 5 is a flow chart showing steps in an example method 500 for determining a test pattern 338 and using the test pattern to test the operation of TGs 122-124 and their communication with process facility computer 140. Method 500 can be implemented via the execution of instructions 224 and/or algorithms 225 by processor 202 within monitoring device 150 and specifically by the execution of test program 312 by processor 202. Method 500 begins at the start block and proceeds to block 502 where processor 202 retrieves test patterns 338 from storage 216. Processor 202 analyzes the test patterns 338 to determine if the test patterns contain a test pattern that is associated with the decoded signal data 332 (block 504). Processor 202 selects one of the test patterns 338 to use in the test. In one embodiment, the selected test pattern is determined based on the selected one of CPs 342-346 selected by the user in block 414.

Processor 202 transmits the selected test pattern 338 to decoder 270 and triggers decoder 270 to convert the digital test pattern into an analog test pattern (block 506). Processor 202 triggers transmitter 272 to generate RF signal 182 from the analog test pattern and to transmit the RF signal 182 on antenna 274 (block 508). When antenna 274 is adjacent to electrical cable 170, RF signal 182 can induce a test signal 178 within conductors of electrical cable 170. The test signal 178 can test and operate various functions within TGs 122-126, CDs, 132-136 and process facility computer 140. Method 500 then ends.

While various disclosed embodiments have been described above, it should be understood that they have been presented by way of example only, and not limitation. Numerous changes to the subject matter disclosed herein can be made in accordance with this Disclosure without departing from the spirit or scope of this Disclosure. In addition, while a particular feature may have been disclosed with respect to only one of several implementations, such feature may be combined with one or more other features of the other implementations as may be desired and advantageous for any given or particular application.

As will be appreciated by one skilled in the art, the subject matter disclosed herein may be embodied as a system, method or computer program product. Accordingly, this Disclosure can take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, this Disclosure may take the form of a computer program product embodied in any tangible medium of expression having computer usable program code embodied in the medium.

Any combination of one or more computer usable or computer readable medium(s) may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include non-transitory media including the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CDROM), an optical storage device, or a magnetic storage device.

The invention claimed is:

1. A method, comprising:
providing a monitoring device including a non-contact electromagnetic sensor (EM sensor) configured for sensing a modulated signal transmitted on a cable including a conductor coupled to a sensing device or apparatus in a process facility, said monitoring device including a non-transitory machine readable storage device and at least one processor, wherein said non-transitory machine readable storage device stores a data decoding program including protocol information for identifying a plurality of different communication protocols;
positioning said monitoring device in proximity to said cable sufficiently close for said EM sensor to detect said modulated signal;
said data decoding program implemented by said processor causing said processor to execute:
responsive to said detecting said modulated signal, conditioning said modulated signal to provide a conditioned modulated signal;
decoding said conditioned modulated signal to generate decoded signal data, and
displaying said decoded signal data.

2. The method of claim 1, further comprising:
receiving a selection of a first communication protocol from among said plurality of different communication protocols stored on said storage device; and
decoding said conditioned modulated signal based on said first communication protocol to generate said decoded signal data.

3. The method of claim 1, further comprising:
analyzing said decoded signal data to determine if an error condition has occurred; and
provided said error condition has occurred, displaying said error condition.

4. The method of claim 1, further comprising:
storing said decoded signal data to said storage device.

5. The method of claim 1, wherein said storage device further stores a test program and said processor is programmed to implement said test program causing said processor to execute:
retrieving a plurality of test patterns from said storage device;
analyzing said plurality of test patterns to determine if said plurality of test patterns contains a first test pattern associated with said decoded signal data;
provided said plurality of test patterns contains said first test pattern associated with said decoded signal data, transmitting said first test pattern.

6. The method of claim 1, wherein said monitoring device further comprises:
a receiver in communication with said EM sensor;
a signal conditioner in communication with said receiver, said signal conditioner receiving said modulated signal and generating said conditioned modulated signal;
an encoder in communication with said signal conditioner and said processor;
a decoder in communication with said processor;
a transmitter in communication with said decoder; and
an antenna connected to said transmitter.

7. A computer program product, comprising:
a non-transitory data storage medium that includes program instructions executable by a processor to enable said processor to execute a method for detecting a modulated signal in a process facility, wherein a monitoring device including a non-contact electromagnetic sensor (EM sensor) is positioned in proximity to a cable sufficiently close for said EM sensor to detect said modulated signal, said cable including a conductor coupled to a sensing device or apparatus in said process facility, and wherein an algorithm for data decoding is stored in said non-transitory data storage medium, said algorithm for data decoding including protocol information for identifying a plurality of different communication protocols, said computer program product comprising:
responsive to detecting said modulated signal, code for conditioning said modulated signal to provide a conditioned modulated signal;
code for decoding said conditioned modulated signal to generate decoded signal data, and
code for displaying said decoded signal data.

8. The computer program product of claim 7, wherein said computer program product further comprises:
code for receiving a selection of a first communication protocol from among said plurality of different communication protocols; and
code for decoding said conditioned modulated signal based on said first communication protocol to generate said decoded signal data.

9. The computer program product of claim 7, wherein said computer program product further comprises:
code for analyzing said decoded signal data to determine if an error condition has occurred; and
provided said error condition has occurred, code for displaying said error condition.

10. The computer program product of claim 7, wherein said computer program product further comprises:
code for storing said decoded signal data to said non-transitory data storage medium.

11. The computer program product of claim 7, wherein an algorithm for testing is stored in said non-transitory data storage medium, said computer program product further comprises:
code for retrieving a plurality of test patterns;
code for analyzing said plurality of test patterns to determine if said plurality of test patterns contains a first test pattern associated with said decoded signal data;
provided said plurality of test patterns contains said first test pattern associated with said decoded signal data, code for transmitting said first test pattern.

12. The computer program product of claim 7, wherein said computer program product further comprises:
a receiver in communication with said EM sensor;
a signal conditioner in communication with said receiver, said signal conditioner receiving said modulated signal and generating said conditioned modulated signal;
an encoder in communication with said signal conditioner and said processor;
a decoder in communication with said processor;
a transmitter in communication with said decoder; and
an antenna connected to said transmitter.

13. A monitoring device comprising:
a non-contact electromagnetic sensor (EM sensor) configured for sensing a modulated signal transmitted on at least one cable including a conductor coupled to a sensing device or an apparatus in a process facility;
a signal conditioner in communication with said EM sensor;
a processor in communication with said signal conditioner, said processor connected to a storage device having a non-transitory machine readable storage medium; wherein said storage device stores a data decoding program including protocol information for identifying a plurality of different communication protocols and said processor is programmed to implement said data decoding program, and
a display coupled to an output of said processor,
wherein said data decoding program causes said processor to:
responsive to detecting said modulated signal, triggering said signal conditioner to condition said modulated signal to provide a conditioned modulated signal;
decoding said conditioned modulated signal to generate decoded signal data; and
displaying said decoded signal data on said display.

14. The monitoring device of claim 13, wherein said data decoding program further causes said processor to:
receive a selection of a first communication protocol from among said plurality of different communication protocols stored on said storage device; and
decoding said conditioned modulated signal based on said first communication protocol to generate said decoded signal data.

15. The monitoring device of claim 13, wherein said data decoding program further causes said processor to:
analyze said decoded signal data to determine if an error condition has occurred; and
provided said error condition has occurred, display said error condition on said display.

16. The monitoring device of claim 13, wherein said data decoding program further causes said processor to:
store said decoded signal data to said storage device.

17. The monitoring device of claim 13 wherein said storage device further stores a test program and said processor is programmed to implement said test program, wherein said test program causes said processor to:
retrieve a plurality of test patterns from said storage device;
analyze said plurality of test patterns to determine if said plurality of test patterns contains a first test pattern associated with said decoded signal data; and
provided said plurality of test patterns contains said first test pattern associated with said decoded signal data, transmit said first test pattern.

18. The monitoring device of claim 13, further comprising:
a receiver in communication with said EM sensor;
a signal conditioner in communication with said receiver, said signal conditioner receiving said modulated signal and generating said conditioned modulated signal;
an encoder in communication with said signal conditioner and said processor;
a decoder in communication with said processor;
a transmitter in communication with said decoder; and
an antenna connected to said transmitter.

* * * * *